(12) United States Patent
Li et al.

(10) Patent No.: US 6,462,137 B2
(45) Date of Patent: Oct. 8, 2002

(54) STAR-BLOCK INTERPOLYMERS AND PREPARATION OF THE SAME

(75) Inventors: Yang Li, Beijing (CN); Hongde Xu, Beijing (CN); Yurong Wang, Dalian (CN); Dingyi Hong, Beijing (CN); Mingchu Gu, Dalian (CN); Mei Wang, Beijing (CN); Zhanxia Lü, Beijing (CN); Aili Xu, Beijing (CN)

(73) Assignees: China Petroleum and Chemical Corporation, Beijing (CN); Research Institute of Beijing Yanshan Petrochemical Co., Ltd., Beijing (CN)

( * ) Notice: Subject to any disclaimer, the term of this patent is extended or adjusted under 35 U.S.C. 154(b) by 0 days.

(21) Appl. No.: 09/982,255

(22) Filed: Oct. 18, 2001
Prior Publication Data
US 2002/0120069 A1 Aug. 29, 2002

(51) Int. Cl.$^7$ .............................................. C08F 297/04
(52) U.S. Cl. ........................ 525/314; 525/244; 525/255; 525/256; 525/258; 525/259; 525/271; 525/272; 525/901
(58) Field of Search ................................ 525/244, 255, 525/256, 258, 259, 271, 272, 314, 901

(56) References Cited

U.S. PATENT DOCUMENTS

| | | | |
|---|---|---|---|
| 3,280,084 A | | 10/1966 | Zelinski et al. |
| 5,194,500 A | * | 3/1993 | Chin et al. ..................... 525/97 |
| 5,262,213 A | | 11/1993 | Rodgers et al. |
| 5,399,627 A | * | 3/1995 | Diehl et al. .................. 525/314 |
| 5,539,058 A | * | 7/1996 | Nicol .......................... 525/314 |
| 5,595,951 A | | 1/1997 | Halasa et al. |
| 6,291,583 B1 | * | 9/2001 | Komatsuzaki et al. .. 525/314 X |

FOREIGN PATENT DOCUMENTS

| | | |
|---|---|---|
| CN | 1148053 | 10/1995 |
| CN | 1197806 | 4/1997 |
| EP | 0573893 | 12/1993 |
| GB | 2124228 | 2/1984 |

\* cited by examiner

Primary Examiner—Fred Teskin
(74) Attorney, Agent, or Firm—William A. Simons; Wiggin & Dena

(57) ABSTRACT

The present invention relates to star-block interpolymers having the following structure $(X-Y)_n-C$, wherein X represents a random copolymer block derived from conjugated diene and monovinyl aromatic monomer; Y represents a polyconjugated diene block; C represents a residue derived from a multifunctional lithium based initiator; and n represents the functionality of the initiator and has a value of not less than 3; and preparation of the same. The star-block interpolymers according to the present invention have in the same molecule both a random copolymer block derived from conjugated diene and monovinyl aromatic monomer and a rubber block selected from the group consisting of a homopolymer block derived from conjugated diene, a tapered copolymer block derived from conjugated dienes, a random copolymer block derived from conjugated dienes and combinations thereof, and hence possess excellent properties of the both kinds of rubbers, and can be used widely as elastomeric materials.

34 Claims, No Drawings

STAR-BLOCK INTERPOLYMERS AND PREPARATION OF THE SAME

BACKGROUND OF THE INVENTION

1. Field of the Invention

The present invention relates to star-block interpolymers of conjugated diene and monovinyl aromatic monomer and preparation of the same. More particularly, the present invention relates to star-block interpolymers having the following structure:

$(X-Y)_n-C$ wherein X represents a random copolymer block derived from conjugated diene and monovinyl aromatic monomer;

Y represents a polyconjugated diene block;

C represents a residue derived from a multifunctional lithium based initiator; and n represents the functionality of the initiator and has a value of not less than 3;

and preparation of the same.

2. Brief Description of Art

Generally, representative block interpolymers based on butadiene, isoprene and styrene are SBS and SIS, wherein SBS is butadiene/styrene triblock copolymers(wherein B represents a polybutadiene block and S represents a polystyrene block), and SIS is isoprene/styrene triblock copolymers(wherein I represents a polyisoprene block and S represents a polystyrene block). By employing difunctional lithium based initiators and changing the charging order of butadiene, isoprene and styrene, block interpolymers having various different structures can be obtained. Such block interpolymers comprise those having the following symmetric structures: (1) S-I-B-I-S(wherein butadiene, isoprene and styrene are charged sequentially); (2) S-B-1-B-S(wherein isoprene, butadiene and styrene are charged sequentially); (3) S-I-BI-I-S(wherein butadiene and isoprene are charged simultaneously at first, and then styrene is charged); (4) S-BS-B-I-B-BS-S(wherein isoprene is charged at first, and then butadiene and styrene are charged simultaneously); (5) S-IS-I-B-I-IS-S(wherein butadiene is charged at first, and then isoprene and styrene are charged simultaneously); and (6) S-IS-I-BI-B-I-IS-S (wherein butadiene, isoprene and styrene are charged simultaneously). In the above formulae, S represents a polystyrene block, B represents a polybutadiene block, I represents a polyisoprene block, BI represents a tapered copolymer block derived from butadiene and isoprene, BS represents a tapered copolymer block derived from butadiene and styrene and IS represents a tapered copolymer block derived from isoprene and styrene.

When butadiene and styrene are charged simultaneously, only a pentablock copolymer represented by the formula S-BS-B-BS-S, which contains a tapered copolymer block derived from butadiene and styrene, can be obtained, due to the difference between the reactivity ratio of butadiene and that of styrene. If a polar modifier is charged while charging butadiene and styrene, the reactivity ratio of butadiene and that of styrene can be changed, and thus butadiene and styrene can be polymerized in a random manner, whereby obtaining a random butadiene/styrene copolymer block SBR.

BRIEF SUMMARY OF THE INVENTION

Based on the above polymer design, the present inventors truly realize the chemical compounding of random conjugated diene/monovinyl aromatic monomer copolymer rubbers and polyconjugated diene rubbers, by firstly synthesizing a rubber block selected from the group consisting of a homopolymer block derived from conjugated diene, a tapered copolymer block derived from conjugated dienes, a random copolymer block derived from conjugated dienes and combinations thereof, and then synthesizing a random copolymer block derived from conjugated diene and monovinyl aromatic monomer, in the presence of a multifunctional lithium based initiator, so as to obtain star-block interpolymers having in the same molecule both said random copolymer block and said rubber block. However, the conventional method for carrying out rubber compounding is to physically blend various rubbers in an open mill or an internal mixer, and thus, the chemically compounding method employed by the present inventors is simpler and the resultant effects are superior.

Therefore, the object of the present invention is to provide novel star-block interpolymers derived from conjugated diene and monovinyl aromatic monomer, which have in the same molecule both a random copolymer block derived from conjugated diene and monovinyl aromatic monomer and a rubber block selected from the group consisting of a homopolymer block derived from conjugated diene, a tapered copolymer block derived from conjugated dienes, a random copolymer block derived from conjugated dienes and combinations thereof, and hence possess excellent properties of the both kinds of rubbers, and can be used widely as elastomeric materials, for example, for preparing tires, especially as rubbers for making tire tread having excellent properties, such a reduced rolling resistance and an improved traction characteristic. The star-block interpolymers according to the present invention can also be further functionalized, for example, hydrogenated, epoxidated, hydroxylated, carboxylated, and the like, and furthermore, can be used to modify plastic materials by blending therewith.

Another object of the present invention is to provide processes for the preparation of the above star-block interpolymers, by which one can realize the chemical compounding in situ in a single reactor instead of physically blending.

Therefore, in one aspect, the present invention relates to star-block interpolymers having the following structure:

$(X-Y)_n-C$ wherein X represents a random copolymer block derived from conjugated diene and monovinyl aromatic monomer;

Y represents a polyconjugated diene block;

C represents a residue derived from a multifunctional lithium based initiator; and n represents the functionality of the initiator and has a value of not less than 3.

In another aspect, the present invention relates to processes for the preparation of the present star-block interpolymers by anionic polymerization.

In still another aspect, the present invention relates to use of the present star-block interpolymers as elastomeric materials.

DETAILED DESCRIPTION OF THE INVENTION

The present invention will be described in more detail as follows.

The term "conjugated diene" used in the present invention means any monomer having in its molecule conjugated double bonds, such as $C_4$–$C_6$ conjugated dienes. The specific examples preferably include butadiene, isoprene, 1,3-pentadiene, 1,3-hexadiene, 2,3-dimethylbutadiene, and mixtures thereof, with butadiene and isoprene being more preferred. The term "monovinyl aromatic monomer" used in the present invention means any aromatic monomer carrying one vinyl substituent on its aromatic ring. The specific examples preferably include styrene or alkyl substituted styrenes such as vinyl toluene(including all isomers), α-methylstyrene, 4-tert.-butylstyrene, 4-methylstyrene, 3,5-diethylstyrene, 3,5-di-n-butylstyrene, 4-n-propylstyrene, 4-dodecylstyrene and mixtures thereof, more preferably styrene, vinyl toluene, α-methylstyrene and mixtures thereof, most preferably styrene.

In the star-block interpolymers according to the present invention, block X is a random copolymer block derived from conjugated diene and monovinyl aromatic monomer. It is preferred that the conjugated diene in block X is butadiene, isoprene or mixture thereof, with butadiene being more preferred. It is preferred that the monovinyl aromatic monomer in block X is styrene or alkyl substituted styrenes, with styrene being more preferred.

In block X, the content of 1,2- or 3,4-addition polymerization structure of the conjugated diene is preferably 6 to 80 percent by weight, more preferably 10 to 50 percent by weight, based on the total weight of the units derived from the conjugated diene in block X.

In block X, the content of the units derived from the monovinyl aromatic monomer is generally 10 to 50 percent by weight, preferably 15 to 35 percent by weight, based on the total weight of block X; and the content of the units derived from the conjugated diene is generally 50 to 90 percent by weight, preferably 65 to 85 percent by weight, based on the total weight of block X.

In the star-block interpolymers according to the present invention, block Y is a polyconjugated diene block selected from the group consisting of a homopolymer block derived from conjugated diene, a tapered copolymer block derived from conjugated dienes, a random copolymer block derived from conjugated dienes and combinations thereof. Preferably, block Y is a block having the following structure:

B,

I,

I-B,

B-I,

I-BR, or

I-IB-B, wherein B represents a homopolymer block derived from butadiene, I represents a homopolymer block derived from isoprene, IB represents a tapered copolymer block derived from butadiene and isoprene, and IBR represents a random copolymer block derived from butadiene and isoprene.

Accordingly, the star-block interpolymers according to the present invention are of the following structure:

(X-B)$_n$-C, (X-I)$_n$-C, (X-B-I)$_n$-C, (X-I-B)$_n$-C, (X-IBR)$_n$-C, or (X-I-IB-B)$_n$-C.

In block Y, the content of 1,2- or 3,4-addition polymerization structure of the conjugated diene is preferably from 6 to 80 percent by weight, more preferably from 6 to 55 percent by weight, most preferably from 6 to 20 percent by weight, based on the total weight of the units derived from the respective conjugated diene in block Y. When block Y contains units derived from two different conjugated dienes, for example when block Y contains homopolymer blocks derived from both butadiene and isoprene, a copolymer block derived from butadiene and isoprene, or combination thereof, especially when block Y is I-B, B-I, IBR or I-IB-B, the weight ratio of butadiene to isoprene in such a block is preferably from 10/90 to 90/10, more preferably from 30/70 to 70/30.

In the star-block interpolymers according to the present invention, the weight ratio of block X to block Y is preferably from 10/90 to 90/10, more preferably from 30/70 to 70/30.

In the star-block interpolymers according to the present invention, n has a value of not less than 3, preferably from 3 to 150, more preferably from 3 to 50, most preferably from 3 to 10.

Preferably, the star-block interpolymers according to the present invention have a number-average molecular weight (Mn) of from $5 \times 10^4$ to $50 \times 10^4$, more preferably from $10 \times 10^4$ to $30 \times 10^4$, as measured by Gel Permeation Chromatography(GPC).

The star-block interpolymers according to the present invention can be prepared by anionic polymerization processes under conventional conditions. In one preferred embodiment, the preparation process comprises the steps of:

a) anionic polymerizing one or more conjugated dienes in a non-polar hydrocarbon solvent in the presence of a multifunctional lithium based initiator and optionally, a polar modifier, until the conjugated diene(s) is polymerized completely, to form block Y; and then b) charging a mixture of conjugated diene and monovinyl aromatic monomer into the reaction mixture obtained in step a) above, continuing the anionic polymerization in the presence of a polar modifier until the polymerization is complete, to form block X.

Depending on the specific structure of block Y, step a) of the process according to the present invention can particularly be:

(1) when block Y is B, butadiene is polymerized in step a); 2) when block Y is I, isoprene is polymerized in step a); (3) when block Y is I-B, in step a) butadiene is first polymerized completely, and then isoprene is charged and polymerized completely;

(4) when block Y is B-I, in step a) isoprene is first polymerized completely, and then butadiene is charged and polymerized completely; (5) when block Y is I-IB-B, in step a) a mixture of butadiene and isoprene is charged into a non-polar hydrocarbon solvent and polymerized completely, in the absence of any polar modifier; (6) when block Y is IBR, in step a) a mixture of butadiene and isoprene is charged into a non-polar hydrocarbon solvent and polymerized completely, in the presence of a polar modifier.

More particularly, the star-block interpolymers represented by the formula (X-B)$_n$-C according to the present invention can be prepared as follows:

Butadiene, in an amount to provide the desired composition of the final interpolymer, is charged to a non-polar hydrocarbon solvent in a reactor, with a polar modifier being optionally charged depending on the desired microstructure of polybutadiene, and the kind and amount of the polar modifier is dependent on the desired content of 1,2-addition polymerization structure in polybutadiene block B. The total concentration of the monomers charged is from 10 to 20 percent by weight. After the stirring is started and the initiation temperature, which is generally about 30 to 80° C., is reached, a multifunctional lithium based initiator is charged in an amount to provide the desired number-average molecular weight of the interpolymer. The multifunctional lithium based initiator can be used alone or in admixtures. After butadiene is polymerized completely, a mixture of conjugated diene and monovinyl aromatic monomer containing a polar modifier is charged to the reactor all at once, with the amounts of the conjugated diene and the monovinyl aromatic monomer being sufficient to provide the desired weight ratio of the conjugated diene and the monovinyl aromatic monomer in block X, to form block X. The purpose of use of the polar modifier is to adjust the reactivity ratio of the conjugated diene and that of the monovinyl aromatic monomer, to achieve the random copolymerization of the conjugated diene and the monovinyl aromatic monomer and to obtain the random copolymer block X. The amount of the polar modifier used shall be sufficient to make the conjugated diene and the monovinyl aromatic monomer copolymerize randomly and can be varied within a wide range depending on the kind of the polar modifier. After the conjugated diene and the monovinyl aromatic monomer are polymerized completely, the polymerization is terminated and the resulted polymer product is recovered in a conventional manner.

More particularly, the star-block interpolymers represented by the formula $(X-I)_n$-C according to the present invention can be prepared as follows:

Isoprene, in an amount to provide the desired composition of the final interpolymer, is charged to a non-polar hydrocarbon solvent in a reactor, with a polar modifier being optionally charged depending on the desired microstructure of polyisoprene, and the kind and amount of the polar modifier is dependent on the desired content of 3,4-addition polymerization structure in polyisoprene block 1. The total concentration of the monomers charged is from 10 to 20 percent by weight. After the stirring is started and the initiation temperature, which is generally about 30 to 80° C., is reached, a multifunctional lithium based initiator is charged in an amount to provide the desired number-average molecular weight of the interpolymer. The multifunctional lithium based initiator can be used alone or in admixtures. After isoprene is polymerized completely, a mixture of conjugated diene and monovinyl aromatic monomer containing a polar modifier is charged to the reactor all at once, with the amounts of the conjugated diene and the monovinyl aromatic monomer being sufficient to provide the desired weight ratio of the conjugated diene and the monovinyl aromatic monomer in block X, to form block X. The purpose of use of the polar modifier is to adjust the reactivity ratio of the conjugated diene and that of the monovinyl aromatic monomer, to achieve the random copolymerization of the conjugated diene and the monovinyl aromatic monomer and to obtain the random copolymer block X. The amount of the polar modifier used shall be sufficient to make the conjugated diene and the monovinyl aromatic monomer copolymerize randomly and can be varied within a wide range depending on the kind of the polar modifier. After the conjugated diene and the monovinyl aromatic monomer are polymerized completely, the polymerization is terminated and the resulted polymer product is recovered in a conventional manner.

More particularly, the star-block interpolymers represented by the formula $(X-I-B)_n$-C according to the present invention can be prepared as follows:

Butadiene, in an amount to provide the desired composition of the final interpolymer, is charged to a non-polar hydrocarbon solvent in a reactor, with a polar modifier being optionally charged depending on the desired microstructure of polybutadiene, and the kind and amount of the polar modifier is dependent on the desired content of 1,2-addition polymerization structure in polybutadiene block B. The total concentration of the monomers charged is from 10 to 20 percent by weight. After the stirring is started and the initiation temperature, which is generally about 30 to 80° C., is reached, a multifunctional lithium based initiator is charged in an amount to provide the desired number-average molecular weight of the interpolymer. The multifunctional lithium based initiator can be used alone or in admixtures. After complete polymerization of butadiene, isoprene in a suitable amount and optionally, a polar modifier are charged to prepare polyisoprene block I. The use of the polar modifier depends on the desired microstructure of polyisoprene, and the kind and amount of the polar modifier is dependent on the desired content of 3,4-addition polymerization structure in polyisoprene block I. After isoprene is polymerized completely, a mixture of conjugated diene and monovinyl aromatic monomer containing a polar modifier is charged to the reactor all at once, with the amounts of the conjugated diene and the monovinyl aromatic monomer being sufficient to provide the desired weight ratio of the conjugated diene and the monovinyl aromatic monomer in block X, to form block X. The purpose of use of the polar modifier is to adjust the reactivity ratio of the conjugated diene and that of the monovinyl aromatic monomer, to achieve the random copolymerization of the conjugated diene and the monovinyl aromatic monomer and to obtain the random copolymer block X. The amount of the polar modifier used shall be sufficient to make the conjugated diene and the monovinyl aromatic monomer copolymerize randomly and can be varied within a wide range depending on the kind of the polar modifier. After the conjugated diene and the monovinyl aromatic monomer are polymerized completely, the polymerization is terminated and the resulted polymer product is recovered in a conventional manner.

More particularly, the star-block interpolymers represented by the formula $(X-B-I)_n$-C according to the present invention can be prepared as follows:

Isoprene, in an amount to provide the desired composition of the final interpolymer, is charged to a non-polar hydrocarbon solvent in a reactor, with a polar modifier being optionally charged depending on the desired microstructure of polyisoprene, and the kind and amount of the polar modifier is dependent on the desired content of 3,4-addition polymerization structure in polyisoprene I. The total concentration of the monomers charged is from 10 to 20 percent by weight. After the stirring is started and the initiation temperature, which is generally about 30 to 80° C., is reached, a multifunctional lithium based initiator is charged in an amount to provide the desired number-average molecular weight of the interpolymer. The multifunctional lithium based initiator can be used alone or in admixtures. After complete polymerization of isoprene, butadiene in a suitable amount and optionally, a polar modifier are charged to prepare polybutadiene block B. The use of the polar modifier depends on the desired microstructure of polybutadiene, and the kind and amount of the polar modifier is dependent on the desired content of 1,2-addition polymerization structure in polybutadiene block B. After butadiene is polymerized completely, a mixture of conjugated diene and monovinyl aromatic monomer containing a polar modifier is charged to the reactor all at once, with the amounts of the conjugated diene and the monovinyl aromatic monomer being sufficient to provide the desired weight ratio of the conjugated diene and the monovinyl aromatic monomer in block X, to form block X. The purpose of use of the polar modifier is to adjust the reactivity ratio of the conjugated diene and that of the monovinyl aromatic monomer, to achieve the random copolymerization of the conjugated diene and the monovinyl aromatic monomer and to obtain the random copolymer block X. The amount of the polar modifier used shall be sufficient to make the conjugated diene and the monovinyl aromatic monomer copolymerize randomly and can be varied within a wide range depending on the kind of the polar modifier. After the conjugated diene and the monovinyl aromatic monomer are polymerized completely, the polymerization is terminated and the resulted polymer product is recovered in a conventional manner.

More particularly, the star-block interpolymers represented by the formula $(X-IBR)_n-C$ according to the present invention can be prepared as follows:

Butadiene and isoprene, in amounts respectively to provide the desired composition of the final interpolymer, are simultaneously charged to a non-polar hydrocarbon solvent in a reactor, together with a first charge of a polar modifier for ensuring the random copolymerization of butadiene and isoprene in block IBR, and the kind and amount of the polar modifier is dependent on the desired content of 1,2- or 3,4-addition polymerization structure in polybutadiene/isoprene block IBR. The total concentration of the monomers charged is from 10 to 20 percent by weight. After the stirring is started and the initiation temperature, which is generally about 30 to 80° C., is reached, a multifunctional lithium based initiator is charged in an amount to provide the desired number-average molecular weight of the interpolymer. The multifunctional lithium based initiator can be used alone or in admixtures. After complete polymerization of butadiene and isoprene, a mixture of conjugated diene and monovinyl aromatic monomer optionally containing a second charge of a polar modifier is charged to the reactor all at once, with the amounts of the conjugated diene and the monovinyl aromatic monomer being sufficient to provide the desired weight ratio of the conjugated diene and the monovinyl aromatic monomer in block X, to form block X. The purpose of use of the polar modifier is to adjust the reactivity ratio of the conjugated diene and that of the monovinyl aromatic monomer, to achieve the random copolymerization of the conjugated diene and the monovinyl aromatic monomer and to obtain the random copolymer block X. The amount of the second charge of the polar modifier used is dependent on the amount of the first charge of the polar modifier. If the amount of the first charge of the polar modifier is sufficient to make the conjugated diene and the monovinyl aromatic monomer, which are charged subsequently, compolymerize randomly, the second charge of the polar modifier can be omitted; and to the contrary, the second charge of the polar modifier shall be charged so as to make the conjugated diene and the monovinyl aromatic monomer copolymerize randomly and its amount can be varied within a wide range depending on the kind of the polar modifier. After the conjugated diene and the monovinyl aromatic monomer are polymerized completely, the polymerization is terminated and the resulted polymer product is recovered in a conventional manner.

More particularly, the star-block interpolymers represented by the formula $(X-I-IB-B)_n-C$ according to the present invention can be prepared as follows:

Butadiene and isoprene, in amounts respectively to provide the desired composition of the final interpolymer, are simultaneously charged to a non-polar hydrocarbon solvent in a reactor, with a polar modifier being optionally charged depending on the desired microstructure of polyconjugated diene block (I-IB-B), and the kind and amount of the polar modifier is dependent on the desired content of 1,2- or 3,4-addition polymerization structure in polyconjugated diene block (I-IB-B). The total concentration of the monomers charged is from 10 to 20 percent by weight. After the stirring is started and the initiation temperature, which is generally about 30 to 80° C., is reached, a multifunctional lithium based initiator is charged in an amount to provide the desired number-average molecular weight of the interpolymer. The multifunctional lithium based initiator can be used alone or in admixtures. After complete polymerization of butadiene and isoprene, a mixture of conjugated diene and monovinyl aromatic monomer containing a polar modifier is charged to the reactor all at once, with the amounts of the conjugated diene and the monovinyl aromatic monomer being sufficient to provide the desired weight ratio of the conjugated diene and the monovinyl aromatic monomer in block X, to form block X. The purpose of use of the polar modifier is to adjust the reactivity ratio of the conjugated diene and that of the monovinyl aromatic monomer, to achieve the random copolymerization of the conjugated diene and the monovinyl aromatic monomer and to obtain the random copolymer block X. The amount of the polar modifier used shall be sufficient to make the conjugated diene and the monovinyl aromatic monomer copolymerize randomly and can be varied within a wide range depending on the kind of the polar modifier. After the conjugated diene and the monovinyl aromatic monomer are polymerized completely, the polymerization is terminated and the resulted polymer product is recovered in a conventional manner.

The polar modifier suitable for the present process is one selected from the group consisting of oxygen-, nitrogen-, sulfur- or phosphorus-containing polar compounds, metal alkoxides and mixtures thereof. The specific examples thereof include (1) oxygen-containing compounds, such as diethyl ether, tetrahydrofuran, a compound represented by the formula $R_1OCH_2CH_2OR_2$ (wherein $R_1$ and $R_2$ can be the same or different, preferably different, and represent an alkyl group having 1 to 6 carbon atoms, such as ethylene glycol dimethyl ether, ethylene glycol diethyl ether), a compound represented by the formula $R_1OCH_2CH_2OCH_2CH_2OR_2$ (wherein $R_1$ and $R_2$ can be the same or different, preferably different, and represent an alkyl group having 1 to 6 carbon atoms, such as diethylene glycol dimethyl ether, diethylene glycol dibutyl ether), and crown ethers; (2) nitrogen-containing compounds, such as triethylamine, tetramethyl ethylenediamine(TMEDA), dipiperidinoethane(DPE), preferably TMEDA; (3) phosphorus-containing compounds, such as hexamethyl phosphoric triamide(HMPA); and (4) metal alkoxides, such as those represented by the formula ROM, wherein R represents an alkyl group having 1 to 6 carbon atoms, O represents an oxygen atom, and M represents a metal cation such as sodium cation($Na^+$) or potassium cation($K^+$), preferably potassium tert-butoxide or potassium tert-amyloxide.

The non-polar hydrocarbon solvent suitable for the present process is selected from the group consisting of non-polar aromatic hydrocarbons, non-polar aliphatic hydrocarbons and mixtures thereof. Specific examples of such solvents include benzene, toluene, ethylbenzene, xylene, pentane, hexane, heptane, octane, cyclohexane, mixed aromatic hydrocarbons such as mixed xylene, mixed aliphatic hydrocarbons such as raffinate oil, or mixtures thereof, preferably hexane, cyclohexane and raffinate oil.

The initiator useful in the present invention can be any multifunctional lithium based initiator disclosed by the prior art and can be used alone or in admixtures. The initiator is preferably selected from the group consisting of those represented by the formula $RLi_n$ or $T(RLi)_n$, wherein R represents a hydrocarbyl having 4 to 20 carbon atoms, such as an aliphatic hydrocarbyl or an aromatic hydrocarbyl, T represents a metal element selected from the group consisting of tin(Sn), silicon(Si), lead(Pb), titanium(Ti), germanium(Ge) and the like, and n represents the functionality of the initiator and has a value of not less than 3, preferably from 3 to 150, more preferably from 3 to 50, most preferably from 3 to 10. The multifunctional lithium based initiator represented by the formula $RLi_n$ can be those obtained by reacting divinylbenzene(DVB) with an alkyl lithium, as mentioned in GB2124228A, U.S. Pat. No. 3,280,084, EP0573893A2, CN1197806A and the like. The multifunctional lithium based initiator can also be those represented by the formula $T(RLi)_n$, which contain the above metal element and can be tin(Sn)-containing multifunctional lithium based initiator represented by the formula $Sn(RLi)_n$, with R and n having the same meaning mentioned above, such as those represented by the formula $Sn(RLi)_4$, as mentioned in CN1148053A. Further, the multifunctional lithium based initiator can be other multifunctional lithium based initiators useful for initiating the polymerization of conjugated dienes, such as butadiene and isoprene, and styrene and having a functionality of not less than 3, such as those mentioned in U.S. Pat. No. 5,262,213 and U.S. Pat. No. 5,595,951.

The amount of the initiator used depends on the desired molecular weight of the star-block interpolymers according to the present invention. In the present invention, the multifunctional lithium based initiator is preferably used in such an amount that the star-block interpolymers according to the present invention have a number-average molecular weight of $5 \times 10^4$ to $50 \times 10^4$, more preferably $10 \times 10^4$ to $30 \times 10^4$.

The polymerization reaction can generally be terminated by using a terminating agent. The terminating agent used in the present invention can be those disclosed by the prior art and useful in anionic polymerization, such as water, methanol, ethanol, isopropanol or the like.

Optionally, conventional additives and fillers, such as antioxidants, can be added into the star-block interpolymers according to the present invention, for example Irganox 1010(trade name, available from Ciba-Geigy AG, Switzerland) and Antigene BHT or 2.6.4(trade name, 2,6-di-tert-butyl-4-methylphenol, available from Sumitomo Chemical Co., Ltd., Japan).

The present invention is further described in detail by means of the following Examples and Comparisons. All parts and percentages are by weight and all temperatures are degrees Celsius unless explicitly stated otherwise.

EXAMPLES

Reference Example

This reference example illustrates the synthesis of the multifunctional lithium based initiator used in the following examples.

Under the highly pure nitrogen, 160 grams of cyclohexane, 11 grams of 1,3-butadiene, 80 mmol of tetrahydrofuran(THF) and 100 mmol of divinylbenzene (DVB) are charged into a 500 ml dry flask and after mixing homogeneously, 100 mmol of n-butyl lithium is charged by a syringe. After reacting 30 minutes at 70° C., a darkly red solution of the multifunctional lithium based initiator is formed, with its concentration being measured by a conventional method.

Example 1

Into a 5 liter stainless reactor equipped with a stirrer are charged 3.5 liters of cyclohexane and 140 grams of butadiene. The reactor is heated to a temperature of 50° C. and then the initiator synthesized in Reference Example is charged thereto in such an amount that the resultant star-block interpolymer has a number-average molecular weight of $15 \times 10^4$. The polymerization of butadiene is completed after 30 minutes. Next, to the reaction mixture are charged 175 grams of butadiene and 35 grams of styrene, together with THF as the polar modifier, with the molar ratio of THF to Li being 35, and the reaction is continued for 60 minutes. After butadiene and styrene are polymerized completely, the reaction is terminated by charging isopropanol as the terminating agent. Finally, 3.5 grams of antioxidant(a mixture of Irganox 1010 and Antigene BHT(2.6.4) in a weight ratio of 1:1) are charged, and then the rubber solution is post-treated by conventional methods. After being dried, the polymer samples are measured for their structural and properties by conventional methods, with the results being shown in Table 1.

Examples 2–7

The procedure similar to Example 1 is followed, except that the amounts of butadiene and styrene are changed, so as to prepare star-block interpolymers $(X-B)_n$-C, wherein X represents a random copolymer block derived from butadiene and styrene(block SBR). The polymerization conditions, and the structures and physical properties of the products are shown in Table 1.

TABLE 1

Polymerization conditions and physical properties of the products

| | Example No. | | | | | | |
|---|---|---|---|---|---|---|---|
| | 1 | 2 | 3 | 4 | 5 | 6 | 7 |
| S (g) | 35 | 105 | 105 | 35 | 70 | 70 | 70 |
| B1 (g) | 140 | 105 | 70 | 105 | 70 | 140 | 105 |
| B2 (g) | 175 | 140 | 175 | 210 | 210 | 140 | 175 |
| S/B2 | 17/83 | 42/58 | 37/63 | 14/86 | 25/75 | 33/67 | 28/72 |
| SBR/B | 60/40 | 70/30 | 80/20 | 70/30 | 80/20 | 60/40 | 70/30 |

TABLE 1-continued

Polymerization conditions and physical properties of the products

| | Example No. | | | | | | |
|---|---|---|---|---|---|---|---|
| | 1 | 2 | 3 | 4 | 5 | 6 | 7 |
| 1,2-B% | 18.5 | 17.0 | 16.8 | 22.0 | 20.7 | 15.6 | 14.8 |
| HI | 1.36 | 1.45 | 1.48 | 1.35 | 1.41 | 1.32 | 1.41 |

Note:
S represents the amount of styrene,
B1 represents the amount of the first charge of butadiene (for the synthesis of block B),
B2 represents the amount of the second charge of butadiene (for the synthesis of block SBR),
S/B2 represents the weight ratio of styrene to butadiene in block SBR,
SBR/B represents the weight ratio of block SBR to block B,
1,2-B% represents the content of 1,2-polybutadiene,
HI represents the molecular weight distribution index (ratio of weight-average molecular weight to number-average molecular weight, Mw/Mn), as measured by Gel Permeation Chromatography (GPC).

Example 8

Into a 5 liter stainless reactor equipped with a stirrer are charged 3.5 liters of cyclohexane and 140 grams of isoprene. The reactor is heated to a temperature of 50° C. and then the initiator synthesized in Reference Example is charged thereto in such an amount that the resultant star-block interpolymer has a number-average molecular weight of $15 \times 10^4$. The polymerization of isoprene is completed after 30 minutes. Next, to the reaction mixture are charged 175 grams of butadiene and 35 grams of styrene, together with THF as the polar modifier, with the molar ratio of THF to Li being 35, and the reaction is continued for 60 minutes. After butadiene and styrene are polymerized completely, the reaction is terminated by charging isopropanol as the terminating agent. Finally, 3.5 grams of antioxidant(a mixture of Irganox 1010 and Antigene BHT(2.6.4) in a weight ratio of 1:1) are charged, and then the rubber solution is post-treated by conventional methods. After being dried, the polymer samples are measured for their structural and properties by conventional methods, with the results being shown in Table 2.

Examples 9–14

The procedure similar to Example 8 is followed, except that the amounts of butadiene, isoprene and styrene are changed, so as to prepare star-block interpolymers $(X-I)_n$-C, wherein X represents block SBR. The polymerization conditions, and the structures and physical properties of the products are shown in Table 2.

TABLE 2

Polymerization conditions and physical properties of the products

| | Example No. | | | | | | |
|---|---|---|---|---|---|---|---|
| | 8 | 9 | 10 | 11 | 12 | 13 | 14 |
| S (g) | 35 | 105 | 105 | 35 | 70 | 70 | 70 |
| I (g) | 140 | 105 | 70 | 105 | 70 | 140 | 105 |
| B (g) | 175 | 140 | 175 | 210 | 210 | 140 | 175 |
| S/B | 17/83 | 42/58 | 37/63 | 14/86 | 25/75 | 33/67 | 28/72 |
| SBR/I | 60/40 | 70/30 | 80/20 | 70/30 | 80/20 | 60/40 | 70/30 |
| 1,2-B% + 3,4-I% | 19.5 | 18.0 | 17.8 | 21.5 | 19.7 | 17.6 | 16.8 |
| HI | 1.37 | 1.42 | 1.38 | 1.35 | 1.31 | 1.40 | 1.36 |

Note:
S represents the amount of styrene,
B represents the amount of butadiene
I represents the amount of isoprene,
S/B represents the weight ratio of styrene to butadiene in block SBR,
SBR/I represents the weight ratio of block SBR to block I,
1,2-B% + 3,4-I% represents the sum of the content of 1,2-polybutadiene and the content of 3,4-polyisoprene,
HI represents the molecular weight distribution index (ratio of weight-average molecular weight to number-average molecular weight, Mw/Mn), as measured by GPC.

Example 15

Into a 5 liter stainless reactor equipped with a stirrer are charged 3.5 liters of cyclohexane and 70 grams of butadiene. The reactor is heated to a temperature of 50° C. and then the initiator synthesized in Reference Example is charged thereto in such an amount that the resultant star-block interpolymer has a number-average molecular weight of $15 \times 10^4$. The polymerization of butadiene is completed after 30 minutes and then 70 grams of isoprene is charged into the reaction mixture. The polymerization of isoprene is completed after 30 minutes. Next, to the reaction mixture are charged 175 grams of butadiene and 35 grams of styrene, together with THF as the polar modifier, with the molar ratio of THF to Li being 35, and the reaction is continued for 60 minutes. After butadiene and styrene are polymerized completely, the reaction is terminated by charging isopropanol as the terminating agent. Finally, 3.5 grams of antioxidant(a mixture of Irganox 1010 and Antigene BHT (2.6.4) in a weight ratio of 1:1) are charged, and then the rubber solution is post-treated by conventional methods. After being dried, the polymer samples are measured for their structural and properties by conventional methods, with the results being shown in Table 3.

Examples 16–21

The procedure similar to Example 15 is followed, except that the amounts of butadiene, isoprene and styrene and the charging order of butadiene and isoprene are changed, so as to prepare star-block interpolymers $(X-A1-A2)_n-C$, wherein X represents block SBR, A1 and A2 are different from each other and respectively represent polybutadiene block and polyisoprene block. The polymerization conditions, and the structures and physical properties of the products are shown in Table 3.

TABLE 3

Polymerization conditions and physical properties of the products

| | Example No. | | | | | | |
|---|---|---|---|---|---|---|---|
| | 15 | 16 | 17 | 18 | 19 | 20 | 21 |
| S (g) | 35 | 105 | 105 | 35 | 70 | 70 | 70 |
| A1 (g) | I:70 | I:45 | I:35 | I:45 | B:35 | B:70 | B:60 |
| A2 (g) | B:70 | B:60 | B:35 | B:60 | I:35 | I:70 | I:45 |
| B2 (g) | 175 | 140 | 175 | 210 | 210 | 140 | 175 |
| S/B2 | 17/83 | 42/58 | 37/63 | 14/86 | 25/75 | 33/67 | 28/72 |
| SBR/(A1 + A2) | 60/40 | 70/30 | 80/20 | 70/30 | 80/20 | 60/40 | 70/30 |
| A1/A2 | 1/1 | 3/4 | 1/1 | 3/4 | 1/1 | 1/1 | 4/3 |
| 1,2-B% + 3,4-I% | 17.5 | 18.6 | 17.8 | 22.4 | 21.7 | 17.6 | 18.8 |
| HI | 1.31 | 1.44 | 1.39 | 1.37 | 1.36 | 1.38 | 1.41 |

Note:
S represents the amount of styrene,
A1 and A2 represent the amounts of butadiene (B) and isoprene (I), respectively,
B2 represents the amount of butadiene in block SBR,
S/B2 represents the weight ratio of styrene to butadiene in block SBR,
SBR/(A1 + A2) represents the weight ratio of block SBR to the sum of polyconjugated diene blocks,
A1/A2 represents the weight ratio of the two polyconjugated diene blocks,
1,2-B% + 3,4-I% represents the sum of the content of 1,2-polybudiene and the content of 3,4-polyisoprene,
HI represents the molecular weight distribution index (ratio of weight-average molecular weight to number-average molecular weight, Mw/Mn), as measured by GPC.

Example 22

Into a 5 liter stainless reactor equipped with a stirrer are charged 3.5 liters of cyclohexane, 70 grams of butadiene and 70 grams of isoprene, followed by THF as the polar modifier, with the molar ratio THF to Li being 35. The reactor is heated to a temperature of 50° C. and then the initiator synthesized in Reference Example is charged thereto in such an amount that the resultant star-block interpolymer has a number-average molecular weight of $15 \times 10^4$. The polymerization of butadiene and isoprene is completed after 30 minutes. Next, to the reaction mixture are charged 175 grams of butadiene and 35 grams of styrene, and the reaction is continued for 60 minutes. After butadiene and styrene are polymerized completely, the reaction is terminated by charging isopropanol as the terminating agent. Finally, 3.5 grams of antioxidant(a mixture of Irganox 1010 and Antigene BHT(2.6.4) in a weight ratio of 1:1) are charged, and then the rubber solution is post-treated by conventional methods. After being dried, the polymer samples are measured for their structural and properties by conventional methods, with the results being shown in Table 4.

Examples 23–28

The procedure similar to Example 22 is followed, except that the amounts of butadiene, isoprene and styrene are changed, so as to prepare star-block interpolymers (X-IBR)$_n$-C, wherein X represents block SBR. The polymerization conditions, and the structures and physical properties of the products are shown in Table 4.

of antioxidant(a mixture of Irganox 1010 and Antigene BHT(2.6.4) in a weight ratio of 1:1) are charged, and then the rubber solution is post-treated by conventional methods. After being dried, the polymer samples are measured for

TABLE 4

Polymerization conditions and physical properties of the products

| | Example No. | | | | | | |
|---|---|---|---|---|---|---|---|
| | 2 | 23 | 24 | 25 | 26 | 27 | 28 |
| S (g) | 35 | 105 | 105 | 35 | 70 | 70 | 70 |
| I (g) | 70 | 45 | 35 | 75 | 35 | 70 | 60 |
| B1 (g) | 70 | 60 | 35 | 30 | 35 | 70 | 45 |
| I/B1 | 1/1 | 3/4 | 1/1 | 5/2 | 1/1 | 1/1 | 4/3 |
| B2 (g) | 175 | 140 | 175 | 210 | 210 | 140 | 175 |
| S/B2 | 17/83 | 42/58 | 37/63 | 14/86 | 25/75 | 33/67 | 28/72 |
| SBR/IBR | 60/40 | 70/30 | 80/20 | 70/30 | 80/20 | 60/40 | 70/30 |
| 1,2-B% + 3,4-I% | 22.5 | 19.0 | 21.8 | 20.8 | 22.7 | 17.6 | 19.3 |
| HI | 1.33 | 1.40 | 1.41 | 1.34 | 1.36 | 1.38 | 1.38 |

Note:
S represents the amount of styrene,
B1 represents the amount of butadiene in block IBR,
B2 represents the amount of butadiene in block SBR,
S/B2 represents the weight ratio of styrene to butadiene in block SBR,
I/B1 represents the weight ratio of isoprene to butadiene in block IBR,
SBR/IBR represents the weight ratio of block SBR to block IBR,
1,2-B% + 3,4-I% represents the sum of the content of 1,2-polybutadiene and the content of 3,4-polyisoprene,
HI represents the molecular weight distribution index (ratio of weight-average molecular weight to number-average molecular weight, Mw/Mn), as measured by GPC.

Example 29

Into a 5 liter stainless reactor equipped with a stirrer are charged 3.5 liters of cyclohexane, 70 grams of butadiene and 70 grams of isoprene. The reactor is heated to a temperature of 50° C. and then the initiator synthesized in Reference Example is charged thereto in such an amount that the resultant star-block interpolymer has a number-average molecular weight of $15 \times 10^4$. The polymerization of butadiene and isoprene is completed after 60 minutes. Next, to the reaction mixture are charged 158 grams of butadiene and 52 grams of styrene, together with THF as the polar modifier, with the molar ratio of THF to Li being 35, and the reaction is continued for 45 minutes. After butadiene and styrene are polymerized completely, the reaction is terminated by charging isopropanol as the terminating agent. Finally, 3.5 grams their structural and properties by conventional methods, with the results being shown in Table 5.

Examples 30–35

The procedure similar to Example 29 is followed, except that the amounts of butadiene, isoprene and styrene are changed, so as to prepare star-block interpolymers (X-I-IB-B)$_n$-C, wherein X represents block SBR. The polymerization conditions, and the structures and physical properties of the products are shown in Table 5.

TABLE 5

Polymerization conditions and physical properties of the products

| | Example No. | | | | | | |
|---|---|---|---|---|---|---|---|
| | 29 | 30 | 31 | 32 | 33 | 34 | 35 |
| S (g) | 52 | 62 | 70 | 62 | 45 | 35 | 62 |
| I (g) | 70 | 45 | 35 | 75 | 70 | 70 | 60 |
| B1 (g) | 70 | 60 | 35 | 30 | 105 | 140 | 45 |
| B2 (g) | 158 | 183 | 210 | 183 | 130 | 105 | 183 |
| S/B2 | 1/3 | 1/3 | 1/3 | 1/3 | 1/3 | 1/3 | 1/3 |
| I/BI | 1/1 | 3/4 | 1/1 | 5/2 | 2/3 | 1/2 | 4/3 |
| SBR/(I + IB + B) | 60/40 | 70/30 | 80/20 | 70/30 | 50/50 | 40/60 | 70/30 |

TABLE 5-continued

Polymerization conditions and physical properties of the products

| | Example No. | | | | | | |
|---|---|---|---|---|---|---|---|
| | 29 | 30 | 31 | 32 | 33 | 34 | 35 |
| 1,2-B% + 3,4-I% | 21.5 | 19.9 | 17.8 | 21.7 | 23.1 | 17.6 | 18.8 |
| HI | 1.37 | 1.37 | 1.45 | 1.42 | 1.35 | 1.30 | 1.40 |

Note:
S represents the amount of styrene,
I represents the amount of isoprene,
B1 represents the amount of the first charge of butadiene (for the synthesis of block I + IB + B),
B2 represent the amount of the second charge of butadiene (for the synthesis of block SBR),
S/B2 represents the weight ratio of styrene to butadiene in block SBR,
I/B1 represents the weight ratio of isoprene to butadiene in block I + IB + B,
SBR/(I + IB + B) represents the weight ratio of block SBR to polyconjugated diene block,
1,2-B% + 3,4-I% represents the sum of the content of 1,2-polybutadiene and the content of 3,4-polyisoprene,
HI represents the molecular weight distribution index (ratio of weight-average molecular weight to number-average molecular weight, Mw/Mn), as measured by GPC.

Note: S represents the amount of styrene, I represents the amount of isoprene, B1 represents the amount of the first charge of butadiene(for the synthesis of block I+IB+B), B2 represent the amount of the second charge of butadiene(for the synthesis of block SBR), S/B2 represents the weight ratio of styrene to butadiene in block SBR, I/B1 represents the weight ratio of isoprene to butadiene in block I+IB+B, SBR/(I+IB+B) represents the weight ratio of block SBR to polyconjugated diene block, 1,2-B%+3,4-I% represents the sum of the content of 1,2-polybutadiene and the content of 3,4-polyisoprene, HI represents the molecular weight distribution index(ratio of weight-average molecular weight to number-average molecular weight, Mw/Mn), as measured by GPC.

While the invention has been described above with reference to specific embodiments thereof, it is apparent that many changes, modifications, and variations can be made without departing from the inventive concept disclosed herein. Accordingly, it is intended to embrace all such changes, modifications and variations that fall within the spirit and broad scope of the appended claims. All patent applications, patents and other publications cited herein are incorporated by reference in their entirety.

What is claimed is:

1. A star-block interpolymer having the following structure:

$(X-Y)_n-C$ wherein X represents a random copolymer block derived from conjugated diene and monovinyl aromatic monomer;
Y represents a polyconjugated diene block;
C represents a residue derived from a multifunctional lithium based initiator; and
n represents the functionality of the initiator and has a value of not less than 3.

2. The star-block interpolymer according to claim 1, having a number-average molecular weight of $5\times10^4$ to $50\times10^4$ and a weight ratio of block X to block Y of 10/90 to 90/10.

3. The star-block interpolymer according to claim 2, having a number-average molecular weight of $5\times10^4$ to $50\times10^4$ and a weight ratio of block X to block Y of 30/70 to 70/30.

4. The star-block interpolymer according to claim 1, wherein block X is a random copolymer block derived from butadiene and styrene and the content of the units derived from styrene is 10 to 50 percent by weight and the content of the units derived from butadiene is 50 to 90 percent by weight, based on the total weight of block X.

5. The star-block interpolymer according to claim 4, wherein the content of the units derived from styrene is 15 to 35 percent by weight and the content of the units derived from butadiene is 65 to 85 percent by weight, based on the total weight of block X.

6. The star-block interpolymer according to claim 1, wherein said block Y is selected from a group consisting of a homopolymer block derived from conjugated diene, a tapered copolymer block derived from conjugated dienes, a random copolymer block derived from conjugated dienes and combinations thereof, and when block Y contains units derived from two different conjugated dienes, the weight ratio therebetween is 10/90 to 90/10.

7. The star-block interpolymer according to claim 6, wherein when block Y contains units derived from two different conjugated dienes, the weight ratio therebetween is 30/70 to 70/30.

8. The star-block interpolymer according to claim 1, wherein the content of 1,2- or 3,4-polyconjugated diene in said block X is 6 to 80 percent by weight, based on the total weight of units derived from conjugated dienes in said block X.

9. The star-block interpolymer according to claim 8, wherein the content of 1,2- or 3,4-polyconjugated diene in said block X is 10 to 50 percent by weight, based on the total weight of units derived from conjugated dienes in said block X.

10. The star-block interpolymer according to claim 1, wherein said block Y is selected from the group consisting of B, I, B-I, I-B, IBR and I-IB-B, in which B represents a polybutadiene block, I represents a polyisoprene block, IBR represents a random copolymer block derived from butadiene and isoprene and IB represents a tapered copolymer block derived from butadiene and isoprene.

11. The star-block interpolymer according to claim 10, wherein when said block Y is B or I, the content of 1,2-polybutadiene or 3,4-polyisoprene in said block Y is 6 to 80 percent by weight, based on the total weight of units derived from butadiene or isoprene in said block Y.

12. The star-block interpolymer according to claim 11, wherein the content of 1,2-polybutadiene or 3,4-polyisoprene in said block Y is 6 to 55 percent by weight, based on the total weight of units derived from butadiene or isoprene in said block Y.

13. The star-block interpolymer according to claim 12, wherein the content of 1,2-polybutadiene or 3,4-polyisoprene in said block Y is 6 to 20 percent by weight, based on the total weight of units derived from butadiene or isoprene in said block Y.

14. The star-block interpolymer according to claim 10, wherein when said block Y is I-B, B-I, IBR or I-IB-B, the content of 1,2-polybutadiene and that of 3,4-polyisoprene in said block Y are respectively 6 to 80 percent by weight, based on the total weight of units derived from butadiene or isoprene in said block Y, respectively.

15. The star-block interpolymer according to claim 14, wherein the content of 1,2-polybutadiene and that of 3,4-polyisoprene in said block Y are respectively 6 to 55 percent by weight, based on the total weight of units derived from butadiene or isoprene in said block Y, respectively.

16. The star-block interpolymer according to claim 15, wherein the content of 1,2-polybutadiene and that of 3,4-polyisoprene in said block Y are respectively 6 to 20 percent by weight, based on the total weight of units derived from butadiene or isoprene in said block Y, respectively.

17. A process for the preparation of the star-block interpolymer according to claim 1, comprising the steps of:

a) anionic polymerizing one or more conjugated dienes in a non-polar hydrocarbon solvent in the presence of a multifunctional lithium based initiator and optionally, a polar modifier, until the conjugated diene(s) is polymerized completely, to form block Y according to claim 1; and then b) charging a mixture of conjugated diene and monovinyl aromatic monomer into the reaction mixture obtained in step a) above, continuing the anionic polymerization in the presence of a polar modifier until the polymerization is complete, to form block X according to claim 1.

18. The process according to claim 17, wherein said step a) comprises:

(1) butadiene is polymerized in the absence of a polar modifier to form block B; or (2) isoprene is polymerized in the absence of a polar modifier to form block I; or (3) butadiene and isoprene are polymerized in that order in the absence of a polar modifier to form block I-B; or (4) isoprene and butadiene are polymerized in that order in the absence of a polar modifier to form block B-I; or (5) a mixture of butadiene and isoprene is polymerized in the absence of a polar modifier to form block I-IB-B; or (6) a mixture of butadiene and isoprene is polymerized in the presence of a polar modifier to form block IBR;

in which B represents a polybutadiene block, I represents a polyisoprene block, IBR represents a random copolymer block derived from butadiene and isoprene and IB represents a tapered copolymer block derived from butadiene and isoprene.

19. The process according to claim 17, wherein said multifunctional lithium based initiator is selected from the group consisting of compounds represented by the formula $RLi_n$ or $T(RLi)_n$ and mixtures thereof, in which R represents a hydrocarbyl having 4 to 20 carbon atoms, T represents a metal element selected from the group consisting of tin(Sn), silicon(Si), lead(Pb), titanium(Ti) and germanium(Ge), and n represents the functionality of the initiator and has a value of not less than 3.

20. The process according to claim 19, wherein said multifunctional lithium based initiator represented by the formula $RLi_n$ is one obtained by reacting divinylbenzene with an alkyl lithium.

21. The process according to claim 19, wherein said multifunctional lithium based initiator represented by the formula $T(RLi)_n$ is tin(Sn)-containing multifunctional lithium based initiator represented by the formula $Sn(RLi)_n$.

22. The process according to claim 21, wherein said multifunctional lithium based initiator represented by the formula $Sn(RLi)_n$ is $Sn(RLi)_4$.

23. The process according to claim 17, wherein said non-polar hydrocarbon solvent is benzene, toluene, ethylbenzene, xylene, pentane, hexane, heptane, octane, cyclohexane, mixed xylene or raffinate oil.

24. The process according to claim 23, wherein said non-polar hydrocarbon solvent is hexane, cyclohexane or raffinate oil.

25. The process according to claim 17, wherein said polar modifier is selected from the group consisting of oxygen-, nitrogen-, sulfur- or phosphorus-containing polar compounds, metal alkoxides and mixtures thereof.

26. The process according to claim 25, wherein said oxygen-containing polar modifier is diethyl ether, tetrahydrofuran, compounds represented by the formula $R_1OCH_2CH_2OR_2$ or $R_1OCH_2CH_2OCH_2CH_2OR_2$, or mixtures thereof, in which RI and $R_2$ are the same or different and represents an alkyl groups having 1 to 6 carbon atoms.

27. The process according to claim 26, wherein said oxygen-containing polar modifier is ethylene glycol dimethyl ether, ethylene glycol diethyl ether, diethylene glycol dimethyl ether, diethylene glycol dibutyl ether, crown ethers, or mixtures thereof.

28. The process according to claim 25, wherein said nitrogen-containing polar modifier is triethylamine, tetramethyl ethylenediamine(TMEDA), dipiperidinoethane (DPE) or mixtures thereof.

29. The process according to claim 28, wherein said nitrogen-containing polar modifier is tetramethyl ethylenediamine(TMEDA).

30. The process according to claim 25, wherein phosphorus-containing polar modifier is hexamethyl phosphoric triamide(HMPA).

31. The process according to claim 25, wherein said metal alkoxide is compounds represented by the formula ROM, in which R represents an alkyl group having 1 to 6 carbon atoms, O represents an oxygen atom, and M represents a metal cation, such as sodium cation($Na^+$) or potassium cation($K^+$).

32. The process according to claim 31, wherein said metal alkoxide is potassium tert-butoxide or potassium tert-amyloxide.

33. The process according to claim 17, wherein the total concentration of the monomers charged is 10 to 20 percent by weight.

34. The process according to claim 17, wherein the initiation temperature is from 30 to 80° C.

* * * * *